Figure 3:
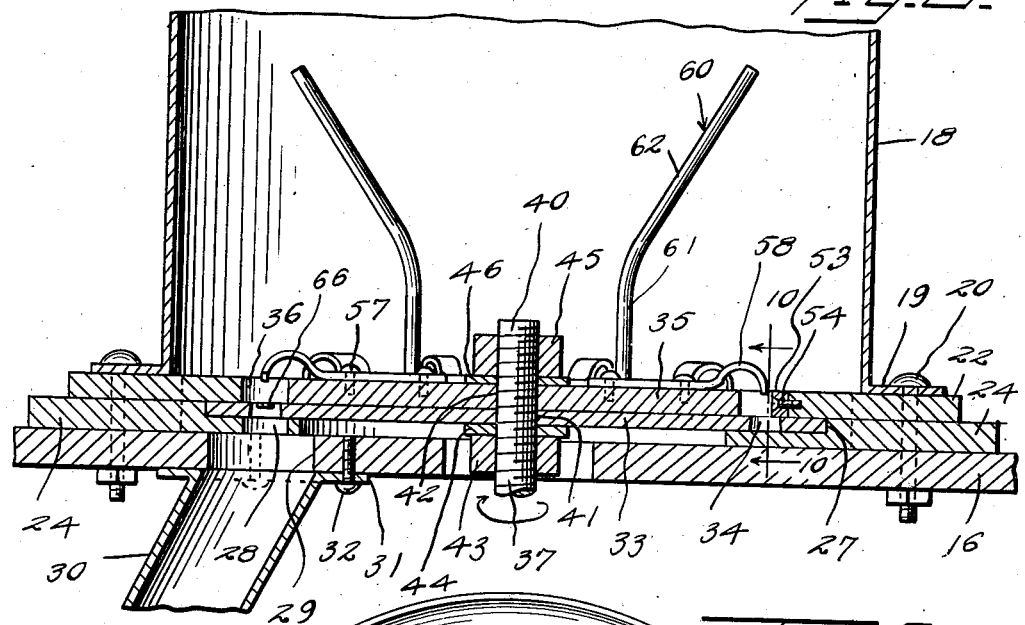

Sept. 12, 1944.  J. L. BRADEN  2,358,208
BEET DRILL AND SEED MILL
Filed Oct. 15, 1941  3 Sheets-Sheet 1
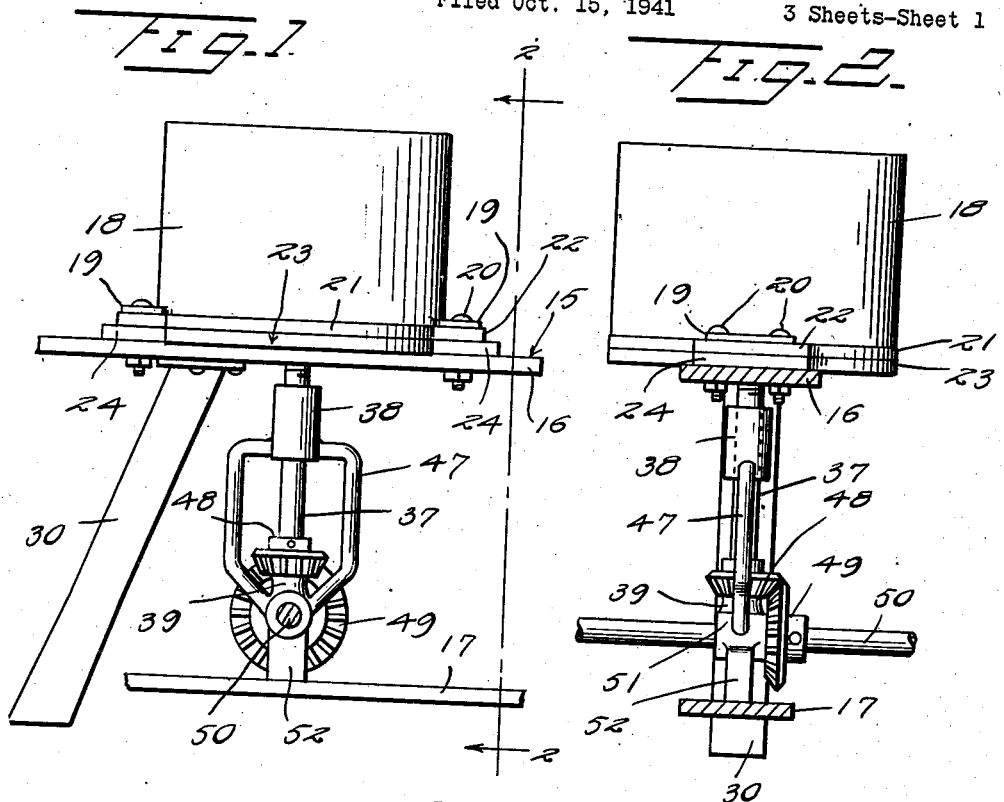
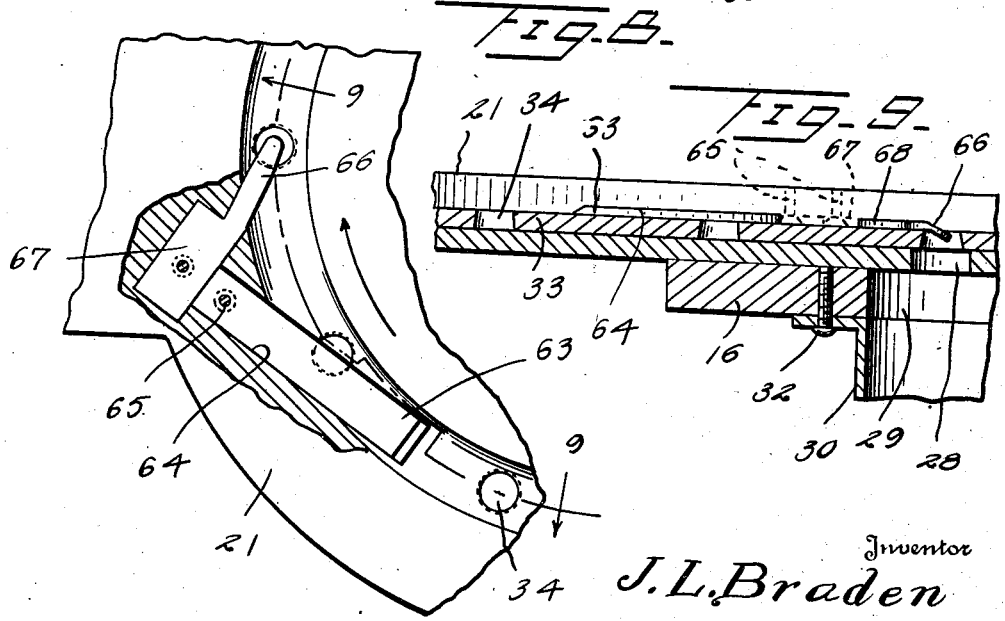
Inventor
J. L. Braden
By Kimmel & Crowell
Attorneys Sept. 12, 1944.   J. L. BRADEN   2,358,208
BEET DRILL AND SEED MILL
Filed Oct. 15, 1941   3 Sheets-Sheet 2

Inventor
J. L. Braden
By Kimmel & Crowell
Attorneys

Sept. 12, 1944. J. L. BRADEN 2,358,208
BEET DRILL AND SEED MILL
Filed Oct. 15, 1941 3 Sheets-Sheet 3
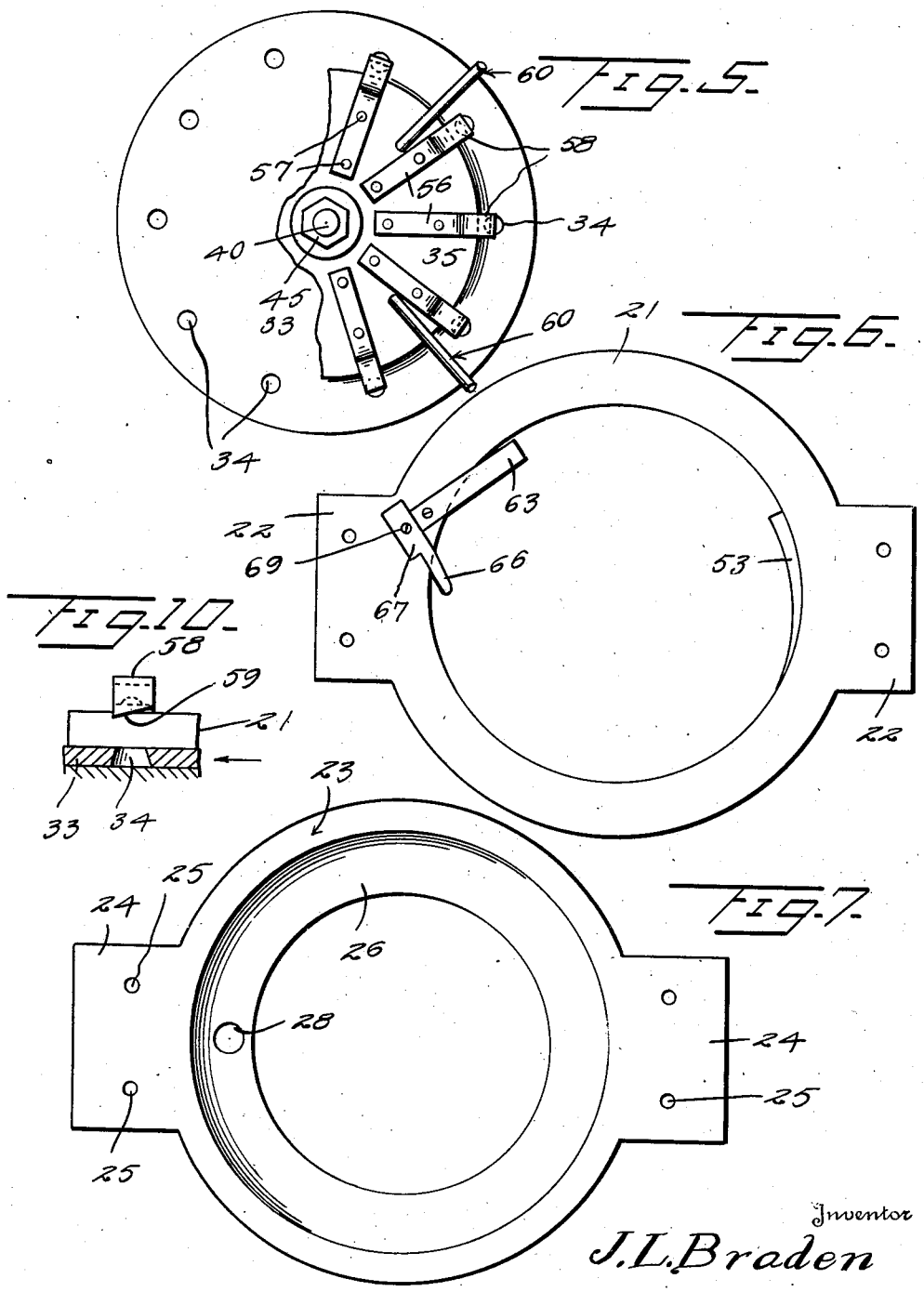

Patented Sept. 12, 1944

2,358,208

UNITED STATES PATENT OFFICE 2,358,208

BEET DRILL AND SEED MILL

John L. Braden, Burley, Idaho

Application October 15, 1941, Serial No. 415,122

6 Claims. (Cl. 146—59)

This invention relates to a combined seed comminuting and seed drill.

It is well known that certain seeds, such as beet seeds or the like are provided with a number of seed germs, and the planting drills now available discharge one or more of the seeds into a trough in the ground at predetermined distances apart. These germs result in an excess number of plants growing in a restricted area and require a subsequent thinning out process which is usually a hand operation due to the crowding of the plants. It is, therefore, an object of this invention to provide a seed reducing or comminuting structure wherein the multiple germ seed is reduced in size so that a minimum number of plants will grow in one spot thereby reducing the labor necessary to thin out the plants.

Another object of this invention is to provide a structure of this kind which will not only reduce the germ content in each seed particle, but will also permit the planting of a greater area without use of a greater quantity of seeds.

A further object of this invention is to provide a device of this kind which will perform the operations of reducing the seeds and planting the reduced seeds in a single operation, or at the time that the drill is moving over the prepared ground.

A further object of this invention is to provide a device of this kind which is so constructed as to eliminate any possibility of choking of the seed passages.

A further object of this invention is to provide a device of this kind which will permit cross cultivation of the plants and thereby reduce very materially the cost of cultivation of the plants through elimination of substantially all of the hand thinning or hoe thinning operations.

A further object of this invention is to provide a device of this kind which may be readily mounted on beet drill frames now in use as an attachment for the frames and as a substitute for the drill now in use.

A further object of this invention is to provide a seed reducing apparatus which will reduce the number of seed germs in each particle of seed and eliminate the possibility of pulling out all of the plants during the thinning process, as is the case at present where the seed fails to degenerate sufficiently to permit separation of the undesired plants growing from a single seed.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

Figure 4:
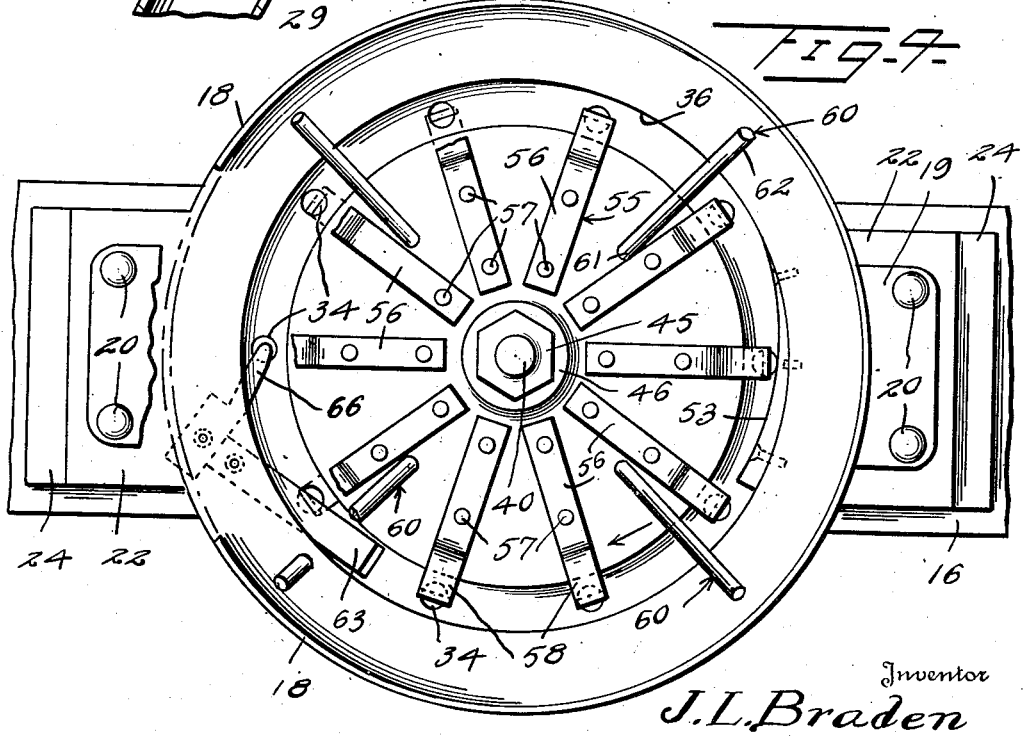

In the drawings:

Figure 1 is a detail side elevation partly in section of a combined seed comminuting and planting drill constructed according to an embodiment of this invention, Figure 2 is a sectional view taken on the line 2—2 of Figure 1, Figure 3 is a vertical section taken through the upper portion of the device, Figure 4 is a detail top plan partly broken away of the device, Figure 5 is a detail top plan partly broken away of the combined agitating and carrier structure, Figure 6 is a detail top plan of the combined comminuting and discharging means, Figure 7 is a detail top plan of the lower delivery plate, Figure 8 is a fragmentary top plan partly in section of the comminuting and delivery structure, Figure 9 is a sectional view taken on the line 9—9 of Figure 8, and Figure 10 is a sectional view taken on the line 10—10 of Figure 3.

Referring to the drawings the numeral 15 designates generally a mobile frame structure including an upper supporting bar 16 and a lower supporting bar 17. A seed hopper 18 of substantially cylindrical construction is mounted above the upper frame member 16 and is provided at the lower end thereof with a pair of oppositely extending ears 19 which are adapted to be secured by fastening devices 20 to the frame member 16. An annular bottom forming member 21 is interposed between the bottom of the hopper 18 and the frame member 16, being provided with a pair of oppositely extending ears or lugs 22 through which the fastening devices 20 are adapted to extend. A lower or base plate 23 is interposed between the lower side of the annulus 21 and the top of the frame member 16, being provided with a pair of diametrically opposed and outwardly extending ears 24 which are formed with openings 25 through which the fastening devices 20 are adapted to extend so that the fastening devices 20 will not only secure the hopper onto the frame member 16, but will also secure the two plates 21 and 23 on the frame member 16.

The plate or annulus 23 is formed with an inwardly extending and downwardly offset annular flange 26 which has an outer diameter substantially greater than the inner circle or diameter of the annulus 21 thereby forming a narrow annular channel 27. The flange 26 is provided at a suitable point with a seed drill port or opening 28 which is adapted to overlie an opening 29 formed in the frame member 16. A downwardly and rearwardly extending tubular seed guide member 30 is adapted to extend downwardly from the frame member 16, and the guide member 30 is formed at its upper end with a flange 31 which is secured by fastening devices 32 to the bottom of the frame member 16. The seed dropping through the delivery opening or port 28 is adapted to pass through the opening 29, and then move downwardly through the guide member 30 where the seed is finally discharged into the trough which is formed in the prepared ground.

A disk shaped plate 33 is rotatably mounted on the flange 26 and has the outer marginal portion thereof rotatably disposed in the inwardly opening guide channel 27 which is formed between the flange 26 and the inner portion of the annulus 21. The disk 33 is formed with a plurality of circumferentially spaced apart seed receiving openings or pockets 34 which are adapted upon rotation of the disk 33, as will be hereinafter described, to register with the delivery port 28 in the lower flange 26. The rotatable disk 33 has mounted on the upper surface thereof a second rotatable disk 35 which is fixed relative to the disk 33 and rotates therewith. The outer diameter of the disk 35 is substantially smaller than the outer diameter of the disk 33 and is smaller than the circle defined by the pockets 34. The peripheral edge of the disk 35 forms with the inner edge of the annulus 21, an annular seed receiving channel 36 within which the seed from the hopper 18 is adapted to engage.

A vertically disposed shaft 37, which is journalled in an upper bearing 38 and a lower bearing 39, is provided at its upper end portion with a threaded portion 40, which is extended through axial openings 41 and 42 formed in the plates or disks 33 and 35 respectively. A lower nut 43 is threaded onto the shaft 37 below the disk 33, and a washer 44 is interposed between the upper end of the nut 43 and the lower side of the disk 33. An upper nut 45 is threaded onto the shaft portion 40, and a washer 46 is interposed between the lower end of the nut 45 and the upper side of the disk 35. In this manner the two disks 33 and 35 are locked against rotation relative to each other and will rotate as a unit with the shaft 37.

The upper and lower bearings 38 and 39 are connected together by means of a pair of substantially U-shaped arms 47. The lower bearing 39 may be secured in any suitable manner to the upper side of the frame member 17. A bevelled gear 48 is fixedly mounted on the shaft 37 between the bearings 38 and 39, and the gear 48 meshes with a driving gear 49 which is fixedly mounted on a driving shaft 50. The shaft 50 is adapted to be connected to a suitable operating portion of the mobile frame structure whereby rotation of the shaft 50 at the desired speed is effected. Preferably the arms 47 at their lower ends are secured to a drive shaft bearing 51 which is secured to or formed integral with a base or supporting member 52 which may be secured in any suitable manner to the frame member 17.

In order to provide a means whereby the seed engaging in the annular channel 36 may be crushed or ground as the disk 35 rotates, I have provided a longitudinally arcuate or wedge shaped crushing member 53 which is secured by fastening devices 54 to the inner edge of the annulus 21 and engages within the channel 36. The thickness of the wedge shaped member 53 at its large end is such as to effect a crushing or grinding of the seed engaging within the channel 36 at a point substantially diametrically opposite the delivery port 28. The seed which engages within the channel 36 is adapted to be held therein so that it will not jump out during the crushing or comminuting operation by means of a plurality of radially arranged holding members generally designated as 55. The holding members 55 each comprise an elongated flat or base bar 56 which is secured by fastening devices 57 to the upper side of the disk 35. The outer end portion of the bar 56 is formed with a longitudinally bent holding finger 58 which is of resilient construction and which has the free end thereof overlying the channel 36 and extending partly downwardly into this channel. The free end or edge of the holding finger 58 is formed on a bevel as indicated at 59 in Figure 10, so that the fingers 58 will have a tendency to force the seeds downwardly into the pockets 34. In practice the fingers 58 overlie each pocket 34 as shown more clearly in Figure 5.

The free or outer end portion of the resilient fingers 58 is disposed in substantially a diametric position with respect to an associated seed pocket 34, and the leading edge of the finger 58 is disposed slightly above the upper surface of the disk 35 so that the seed will be crowded downwardly in the direction of the pocket 34 upon rotation of the disk 35.

A plurality of circumferentially spaced apart seed agitating members generally designated as 60 are secured to and extended upwardly from the disk 35. The agitating members 60 each include a lower vertically disposed bar 61 and an upwardly and outwardly inclined bar 62 which is formed integral with the vertical bar 61. The inclined upper portion 62 of the agitating member 60 is inclined to the vertical in order to effect a downward movement of the seed toward the seed channel 36 upon rotation of the agitating member 60 with the two disks 33 and 35.

In order to provide a means whereby the seed engaging in the pockets 34 may be comminuted or cut, I have provided a cutting blade 63 which is counter-sunk in a recess 64 which is formed in the annulus 21. The blade 63 is secured within the recess 64 by means of one or more fastening devices 65. The cutting end of the blade 63 is adapted to extend into the channel 36 on the upper side of the disk 33 so that any portion of each seed which projects above the pocket 34 will be cut off before the pocket 34 is moved to a position in registry with the delivery port or opening 28. In the event any seed is unduly packed or crowded into a pocket 34 so that when the pocket 34 is in registry with the delivery port or opening 28, it will not readily drop into the delivery port 28, I have provided a resilient seed discharging finger 66. The finger 66 is carried by a base plate 67 which may be secured in a recess 68 formed in the lower side of the annulus 21 adjacent the fixed end of the blade 63. The plate 67 may be secured in the recess 68 by means of a fastening device 69. The discharge or delivery finger 66 extends in a direction at substantially right angles to the length of the cutting blade 63 as shown in Figure 6, and this discharge or delivery finger 66 is positioned directly over the delivery port 28.

In the use and operation of this combined seed comminuting and planting drill the seed is adapted to be placed in the hopper 18 from the upper end thereof and the device then moved over the surface of the prepared ground. The drive shaft 50 is adapted to rotate at the desired speed so as to provide for the desired speed of rotation of the combined seed milling and delivering structure including the two disks 33 and 35. The disk 33 may be provided with as many seed pockets 34 as may be desired, it being understood that the spacing of the seed as discharged through the drill member 30 will be determined by the speed of rotation of the two disks 33 and 35 in addition to the circumferential spacing of the pockets 34.

The lower edge portion of each pocket 34 also forms with the upper end of the delivery port 28 a circular cutting means for cutting or milling any seed, which upon registry of a pocket 34 with the port 28 is not completely discharged into the opening 29. As the two disks 33 and 35 rotate, the seed will gravitatingly drop downwardly into the annular channel 36, and as the rotatable milling member comprising the disk 35 is rotated by the shaft 37 the seed will be crushed between the outer wall of the milling member 35 and the inner face of the wedge shaped milling member 53. The resilient holding finger 58 will prevent the seed from jumping out of the channel 36 or from the pockets 34. As viewed in Figure 4 the milling structure is rotated in a clockwise direction, and the seed in the channel 36 will initially come into engagement with the crushing member 53 and will then be moved within the channel 36 into engagement with the seed cutting blade 63.

After the seed or seeds in a pocket 34 have been cut off by the cutting blade 63, the pocket will be moved to a position in registry with the delivery opening 28 in the lower flange 26. At this point the discharge or delivery finger 66 which will ride over the surface of the disk 33 within the channel 36 will snap downwardly into the registering pocket 34 and forcibly discharge the seed or seeds engaging in such pocket. After removal from the registering pocket 34 the seed will drop through the delivery port 28, the opening 29 and then will gravitatingly move downwardly through the drill member 30 for discharge into the trough which is prepared in the usual manner in the surface of the ground.

With a combined milling or comminuting structure and drill as hereinbefore described, it is possible to reduce the size of a seed such as a beet seed, and the size of each particle is such that it will contain from one to two or three seed germs. It has been found that each beet seed has on an average about six seed germs therein so that by reducing the size of the seed the number of plants germinated by the reduced seed particle will be substantially less than from the whole seed so that the work of thinning out the germinated plants is very much reduced, and it is also possible to not only substantially eliminate the hand or hoe thinning of the plants, but also the cost of thinning can be reduced at least one-half and may be eliminated entirely by cross cultivation with a cultivator.

In actual practice it has been found that the greatest percentage of the seed particles reduced by this machine will contain one seed germ, and the remaining particles will contain from one to three seed germs, while only a very small percentage of the particles will be without any seed germs. By reducing the seed as hereinbefore described it is possible to cover a greater area of ground with the same quantity of seed, which has been heretofore used without crushing or comminuting. This device may be made as an attachment for a conventional seed drill frame, coupled with the operating mechanism of the drill frame and the usual drill structure removed from the frame and the hereinbefore described device substituted therefor.

What is claimed is:

1. A combined seed comminuting and planting drill comprising a hopper, a pair of superposed annular members fixed to said hopper at the lower end thereof, an inwardly extending annular flange carried by the lowermost annular member, a plate rotatably engaging on said flange, means for rotating said plate, said plate having a plurality of circumferentially spaced apart pockets therein, a second plate fixed to the upper side of said first plate, the outer diameter of said second plate being smaller than the inner diameter of the uppermost annular member to thereby form an annular seed channel, said annular flange having a seed discharge port with which said pockets are registerable, a seed cutting blade carried by said uppermost annular member and extending inwardly of said channel for cutting off seed portions projecting above said pockets, and a tubular drill member communicating with said discharge port and depending therebelow.

2. A combined seed comminuting and planting drill comprising a hopper, a pair of superposed annular members fixed to said hopper at the lower end thereof, an inwardly extending annular flange carried by the lowermost annular member, a plate rotatably engaging on said flange, means for rotating said plate, said plate having a plurality of circumferentially spaced apart pockets therein, a second plate fixed to the upper side of said first plate, the outer diameter of said second plate being smaller than the inner diameter of the uppermost annular member to thereby form an annular seed channel, said annular flange having a seed discharge port with which said pockets are registerable, a seed cutting blade carried by said uppermost annular member and extending inwardly of said channel for cutting off seed portions projecting above said pockets, and a resilient delivery finger carried by said uppermost annular member and engageable in said pockets upon rotation of said first plate for forcibly delivering the seeds in said pockets through said discharge port to said drill member.

3. A combined seed comminuting and planting drill comprising a hopper, a pair of superposed annular members fixed to said hopper at the lower end thereof, an inwardly extending annular flange carried by the lowermost annular member, a plate rotatably engaging on said flange, means for rotating said plate, said plate having a plurality of circumferentially spaced apart pockets therein, a second plate fixed to the upper side of said first plate, the outer diameter of said second plate being smaller than the inner diameter of the uppermost annular member to thereby form an annular seed channel, said annular flange having a seed discharge port with which said pockets are registerable, a seed cutting blade carried by said uppermost annular member and extending inwardly of said channel for cutting off seed portions projecting above said pockets, and a wedge shaped milling member fixed to the inner side of said uppermost annular member and projecting into said channel for crushing the seed during rotation of said plates.

4. A combined seed comminuting and planting drill comprising a hopper, a pair of superposed annular members fixed to said hopper at the lower end thereof, an inwardly extending annular flange carried by the lowermost annular member, a plate rotatably engaging on said flange, means for rotating said plate, said plate having a plurality of circumferentially spaced apart pockets therein, a second plate fixed to the upper side of said first plate, the outer diameter of said second plate being smaller than the inner diameter of the uppermost annular member to thereby form an annular seed channel, said annular flange having a seed discharge port with which said pockets are registerable, a seed cutting blade carried by said uppermost annular member and extending inwardly of said channel for cutting off seed portions projecting above said pockets, a wedge shaped milling member fixed to the inner side of said uppermost annular member and projecting into said channel, and radially arranged spring fingers carried by said second plate and projecting into said channel above each pocket.

5. A combined seed comminuting and planting drill comprising a hopper, a pair of superposed annular members fixed to said hopper at the lower end thereof, an inwardly extending annular flange carried by the lowermost annular member, a plate rotatably engaging on said flange, means for rotating said plate, said plate having a plurality of circumferentially spaced apart pockets therein, a second plate fixed to the upper side of said first plate, the outer diameter of said second plate being smaller than the inner diameter of the uppermost annular member to thereby form an annular seed channel, said annular flange having a seed discharge port with which said pockets are registerable, a seed cutting blade carried by said uppermost annular member and extending inwardly of said channel for cutting off seed portions projecting above said pockets, a wedge shaped milling member fixed to the inner side of said uppermost annular member and projecting into said channel, and radially arranged spring seed holding fingers carried by said second plate and projecting into said channel above each pocket, the outer free end of each finger being inclined to the horizontal for assisting in forcing the seeds into the pockets.

6. A combined seed comminuting and planting drill comprising a hopper, a pair of superposed annular members fixed to said hopper at the lower end thereof, an inwardly extending annular flange carried by the lowermost annular member, a plate rotatably engaging on said flange, means for rotating said plate, said plate having a plurality of circumferentially spaced apart pockets therein, a second plate fixed to the upper side of said first plate, the outer diameter of said second plate being smaller than the inner diameter of the uppermost annular member to thereby form an annular seed channel, said annular flange having a seed discharge port with which said pockets are registerable, a seed cutting blade carried by said uppermost annular member and extending inwardly of said channel for cutting off seed portions projecting above said pockets, a wedge-shaped milling member fixed to the inner side of said uppermost annular member and projecting into said channel, means carried by said second plate projecting into said channel for holding the seeds in said pockets, and agitating means fixed to said second plate and extending upwardly therefrom into said hopper.

JOHN L. BRADEN.